(12) United States Patent
Richter et al.

(10) Patent No.: US 7,879,122 B2
(45) Date of Patent: Feb. 1, 2011

(54) AIR FILTER AND FAN DEVICE FOR VEHICLE VENTILATION SYSTEMS

(75) Inventors: Gerald Richter, Aachen (DE); Christoph Malig, Erkelenz (DE); Olaf Degenhardt, Pulheim (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 355 days.

(21) Appl. No.: 12/048,278

(22) Filed: Mar. 14, 2008

(65) Prior Publication Data

US 2008/0229721 A1  Sep. 25, 2008

(30) Foreign Application Priority Data

Mar. 19, 2007  (DE) ...................... 10 2007 014 836

(51) Int. Cl.
*B01D 46/00* (2006.01)
(52) U.S. Cl. .................. 55/385.3; 55/471; 55/385.1; 55/422; 55/520; 55/521; 55/418; 55/420; 55/529; 454/139; 454/158
(58) Field of Classification Search ............... 55/385.1, 55/385.3, 422, 471, 529, 520, 521, 418, 420; 454/139, 158
See application file for complete search history.

(56) References Cited

U.S. PATENT DOCUMENTS

| | | | | |
|---|---|---|---|---|
| 2,335,456 A * | 11/1943 | Seitz | .......................... | 261/78.2 |
| 3,011,336 A * | 12/1961 | Weiss | ....................... | 73/863.12 |
| 3,870,495 A * | 3/1975 | Dixson et al. | .................. | 55/489 |
| 4,198,217 A * | 4/1980 | Erdmannsdorfer | .......... | 55/385.5 |
| 5,888,261 A * | 3/1999 | Fortune | ....................... | 55/400 |
| 6,312,489 B1 * | 11/2001 | Ernst et al. | .................. | 55/385.3 |
| 6,425,819 B2 * | 7/2002 | Maruyama et al. | ........... | 454/139 |
| 6,569,009 B2 * | 5/2003 | Nishikawa et al. | ........... | 454/121 |
| 6,699,310 B2 * | 3/2004 | Oda et al. | ....................... | 96/132 |
| 6,929,671 B2 * | 8/2005 | Kim et al. | ................... | 55/385.1 |
| 7,485,168 B2 * | 2/2009 | Goupil, Jr. | .................. | 55/385.1 |
| 7,497,897 B2 * | 3/2009 | Currle et al. | ................... | 95/270 |
| 7,585,344 B2 * | 9/2009 | Paterson et al. | ............... | 55/413 |
| 7,677,964 B1 * | 3/2010 | Bucher et al. | ................ | 454/356 |
| 2002/0013128 A1 * | 1/2002 | Maruyama et al. | ........... | 454/139 |
| 2002/0124729 A1 * | 9/2002 | Dudley | ......................... | 95/282 |

* cited by examiner

*Primary Examiner*—Duane Smith
*Assistant Examiner*—Minh-Chau Pham
(74) *Attorney, Agent, or Firm*—Fraser Clemens Martin & Miller LLC; J. Douglas Miller

(57) ABSTRACT

An air filter and fan device for a vehicle ventilation system is disclosed that, in direction of air flow, includes an air filter, an impeller, and a flow-off channel. A casing is provided that accommodates the impeller and the flow-off channel in an enclosing manner such that the impeller is established with double-suction, receiving air from the air filter from both a first side and a second side or the impeller.

17 Claims, 5 Drawing Sheets

Prior art

AIR FILTER AND FAN DEVICE FOR VEHICLE VENTILATION SYSTEMS

CROSS-REFERENCE TO RELATED APPLICATION

This application claims the benefit of German Patent Application No. 102007014836.6-16 AIR FILTER AND FAN DEVICE FOR VEHICLE VENTILATION SYSTEMS filed on Mar. 19, 2007, hereby incorporated herein by reference in its entirety.

FIELD OF THE INVENTION

The invention relates to an air filter and fan device for vehicle ventilation systems that serves for cleaning and providing an air volume flow for the ventilation of vehicles.

BACKGROUND OF THE INVENTION

Air filter and fan devices are used in order to ensure in vehicle ventilation systems that the air to be conditioned in the vehicle heating, ventilation, and air conditioning system (HVAC) is mechanically pre-cleaned as far as possible before the air is conditioned thermally. Different types of devices are known from prior art.

In previous applications, the air filter was often arranged in the cowl area in the engine compartment. Therefore, in recirculation mode, air drawn from the passenger compartment was not included in filtering. Particularly disadvantageous of this solution is the fact that to an increasing extent, fouling of the evaporator takes place and hence, due to the deposits developing on the evaporator and heating heat exchanger, increased odor nuisance appears. Also, particles entrained by the air flow can mechanically affect the heat exchangers by abrasion.

In present vehicle ventilation systems, an air filter is typically arranged in front of the fan. This version of arrangement of the air filter in front of the impeller is shown in FIG. 5 representing the state of the art.

As distinct from the version described above, here also the recirculated air is filtered, but this embodiment is disadvantageous in that the overall dimensions of these systems are too large.

Positioning the air filter immediately in front of the impeller results in limited utilization of the total filter surface area while also the pressure losses rise, because the major part of the drawn in air is aspirated in the region above the impeller opening through the air filter, whereas only little air flows over the border regions. Moreover, the constant height of the filter prevents the installation space from being utilized optimally.

Positioning the filter behind the fan cancels, however, the protection of the impeller from large dirt particles so that the impeller may be damaged. In order to avoid these disadvantages, protective grids are typically disposed in front of the impeller, resulting in additional expenditure.

SUMMARY OF THE INVENTION

It is the object of this invention to filter the total air flow entering the HVAC and, at the same time, to achieve reduced pressure losses and prolonged filter life. Particularly, the solution according to the invention should not require an additional use of a protective grid.

According to the invention, the problem is solved by an air filter and fan device for vehicle ventilation systems, the unit in direction of air flow comprising an air filter, an impeller, and a flow-off channel. The air filter and fan device is particularly characterized by that a flow guide system for the air is provided in form of a casing arranged enclosing the impeller and the flow-off channel in such a way that the impeller is established to the double-suction design receiving air from the air filter from both the impeller's upper side and lower side.

Hereby, the concept of arranging the filter in front of the impeller is realized. With the filter arranged immediately in front of the impeller, while at the same time the entering air is enabled to bypass the flow-off channel in the flow guide system, it is achieved that also the border regions of the filter are effectively passed through this further flow path. Use of the flow guide system, which is established in form of a casing completely accommodating the fan and the flow-off channel, eventually, makes possible the establishment of a double-suction fan that takes in air flows from both the upper side of the impeller and the lower side of the impeller, discharging the air flows through the flow-off channel.

According to the invention, the flow path of the air is limited by a flow guiding device in form of a casing. The air enters, first, the casing over the filter. The air flow above the upper side of the impeller flows directly from the upper side of the impeller into the flow-off channel. The remaining air flow flows around the flow-off channel, reaching the range of action of the impeller on the lower side of the impeller, and then flowing into the flow-off channel. Thus there is a direct flow path to the upper side as well as an indirect flow path, first same direction later diverted, to the lower side of the impeller. Flowing of air to both sides of the impeller is referred to as double-suction action.

According to a preferred embodiment of the invention, the fan axis is aligned deviating from the axis of the direction of air flow. In a particularly advantageous manner, an air filter and fan device for vehicle ventilation systems according to the invention is established when the fan axis deviates from the axis of the direction of flow at an angle α of between 8° and 12°. According to the results of investigation, it is particularly advantageous when the fan axis is inclined at an angle α of 10° to the axis of the direction of air flow.

The filter surface area, hence the filter life can additionally be increased when advantageous designs of the filter are used, while optimally utilizing the installation space in this arrangement.

This is particularly achieved by that the filter has varying folding heights.

Another advantageous embodiment of the invention is that the air filter is continuously wedge-shaped, adapted to the inclination of the fan axis.

An alternative embodiment in this connection provides that the air filter is discontinuously stepped, adapted to the inclination of the fan axis. This embodiment is particularly advantageous when the air filter is established discontinuously stepped in three steps.

In a further embodiment the air filter and fan device is provided with an air filter that in the area of the upper side of the impeller has a bigger height compared to the area of passage of air for the lower side of the impeller.

Further, it is advantageous when the air filter is established made of folded paper, which enables the air filter to be manufactured in an especially cost-efficient manner.

The inclination of the fan axis enables significant improvements to be achieved in two-fold way. First, the overall dimensions are reduced, because as provided the air filter can be established closer to the entry into the fan. Hereby, the advance surface area of the filter is not only reached due to the forces that directly act on the flow from the upper side of the impeller, but the same way also by the flow from the lower side of the impeller.

The filter surface area, hence, the filter life can be increased using certain designs of the filter in order to optimally utilize the installation space in this arrangement. Particularly, use of varying folding heights is possible. The folding height can, e.g., linearly decrease with the length, which results in a wedge-shaped filter, or may have a convex or concave course. In conjunction with the inclination of the fan, e.g., the wedge-like shape of the filter is particularly advantageous. Simplified, the filter may also advantageously designed stepped.

In the following, function of the unit will be described.

First, the air is guided to the filter in usual manner through a system of doors. Then, the air passes the air filter over the entire filter surface area and enters the flow guiding device. Through the openings of the double-suction fan, which is designed as radial fan, from the upper and lower sides, the air is then fed to the impeller and flow-off channel, in contrast to prior art, not only from above but also from below, after the partial air flow not aspirated on the upper impeller side has passed around the flow-off channel entering into the impeller from below.

It is a particular advantage of the described embodiment that effective utilization of the total filter surface area is made possible, while at the same time, the pressure loss through the filter is reduced. Furthermore, it should particularly be stressed that only little installation space is required for the filter arrangement, and the fan efficiency is raised because air is drawn from both impeller sides, the upper side and the lower side. In the end, the enlarged effective filter surface area also results in an increased, or prolonged, respectively, filter life and improved filter capacity. This is mainly based on the inclination of the fan motor for enhanced evaporator approach with different location of the fan motor relative to the evaporator. The distance between the filter and the fan entry is preferably chosen to be between 3 and 15 millimeters and the filter heights are between 10 and 40 millimeters.

BRIEF DESCRIPTION OF THE DRAWINGS

Further details, features, and advantages of the present invention will become apparent from consideration of the following description of examples of embodiment when taken in connection with the accompanying drawings in which is shown.

DETAILED DESCRIPTION OF THE INVENTION

Figure 1:
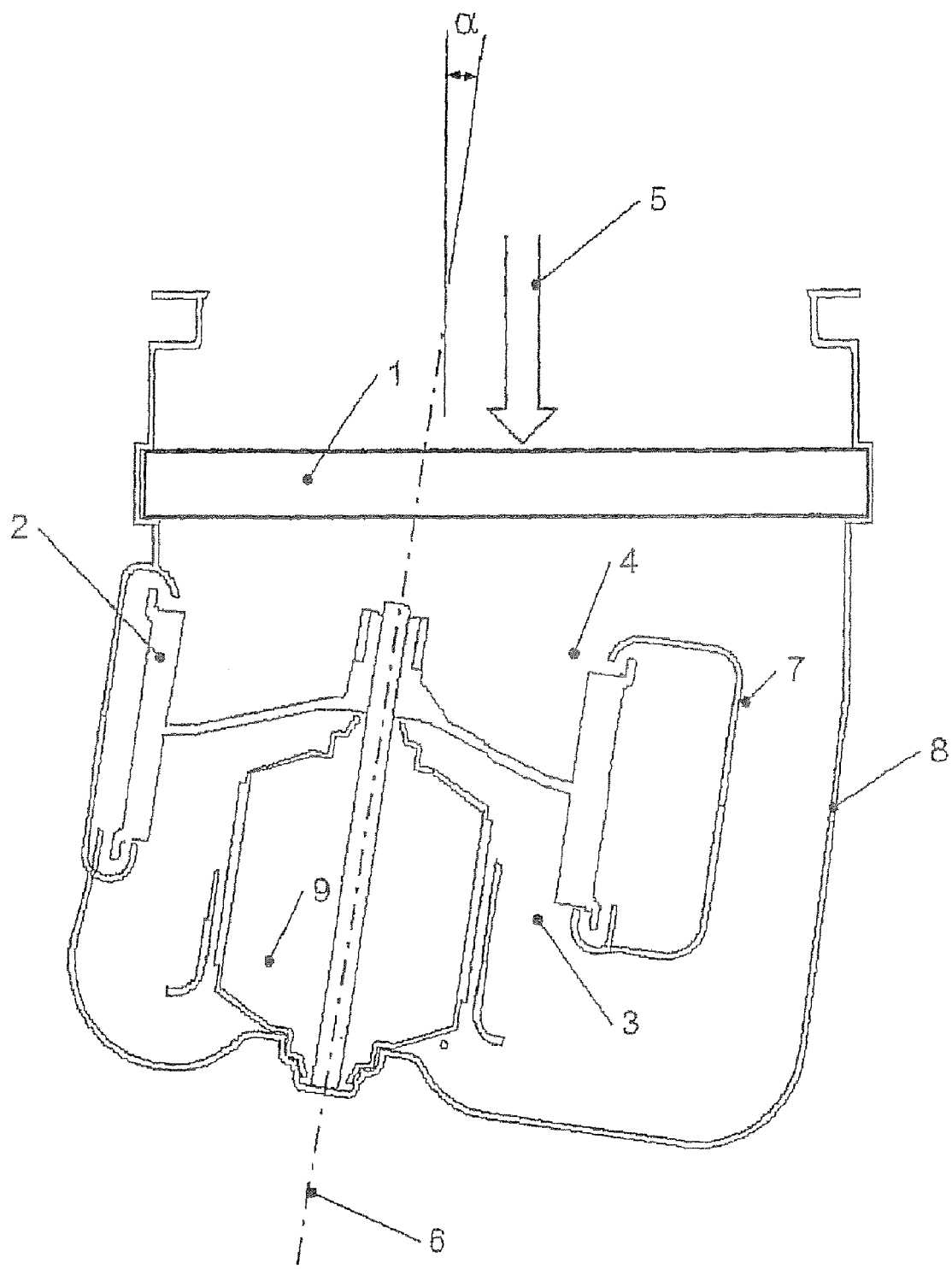
FIG. 1 is an air filter and fan device with inclined fan axis and constant filter height in cross-sectional view.

In FIG. 1, an air filter and fan device for vehicle ventilation systems is shown that discloses an air filter 1 and an impeller 2 with accompanying fan motor 9. The impeller 2 discharges the air directly into a flow-off channel 7, through which the air is eventually fed to the further elements of the air conditioning unit. The flow-off channel 7 encloses the impeller 2 along the circumference of the impeller 2, accommodating the air flowing axially to and radially from the impeller 2.

The air entering the filter unit flows, in direction of flow 5, through the folded air filter 1 into the fan device. Directly accommodating the air filter 1, a flow guiding device 8 is established in form of a casing, where the fan as combination of impeller 2 and fan motor 9 is accommodated as sub component with the inclination shown of the fan axis 6. When the impeller 2 is rotated, the air is drawn in through the air filter 1 and transported in double-suction manner both directly from above to below as well as axially from below into the impeller 2.

The amounts of air passing through the air filter 1, laterally flowing past the impeller 2 and the flow-off channel 7, eventually flow over the lower side 3 of the impeller 2 into the flow-off channel 7, whereas a partial flow directly flows from above into the impeller 2.

Figure 2:
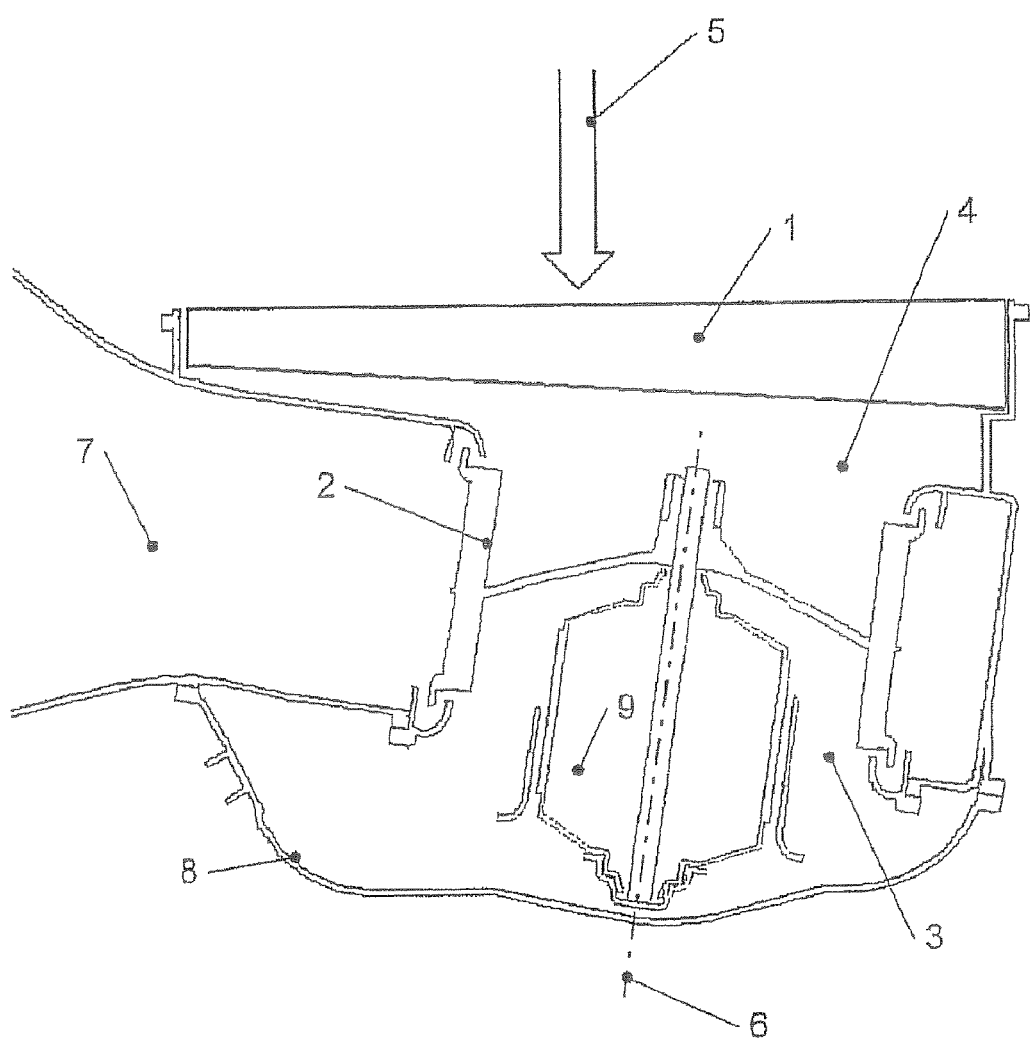
FIG. 2 is an air filter and fan device with inclined fan axis and filter established wedge-shaped, in cross-sectional view.

In FIG. 2, another air filter and fan device for vehicle ventilation systems is shown that, in contrast to the device shown in FIG. 1, is provided with a filter 1 established wedge-shaped. The wedge-like establishment of the air filter 1 leads to an increased filter surface area due to extended individual filter paper plates.

The suction pressure created by the impeller 2 is, first, compensated for by an air volume flow that enters directly on the upper side 4 of the impeller 2. If, in this region the filter height is not varied, air will mainly flow in a direct way through the filter 1 into the impeller 2 and the flow-off channel 7. But if the filter flow resistance is increased on the side directly toward the upper side 4 of the impeller 2, correspondingly the air will also flow through the regions of the filter 1 that are not directly assigned to the lower side 3 of impeller 2. This improves passage through the filter, making it more homogeneous. The inclination of the fan axis 6 further leads to that the fan can be arranged closer to the filter 1.

Figure 3:
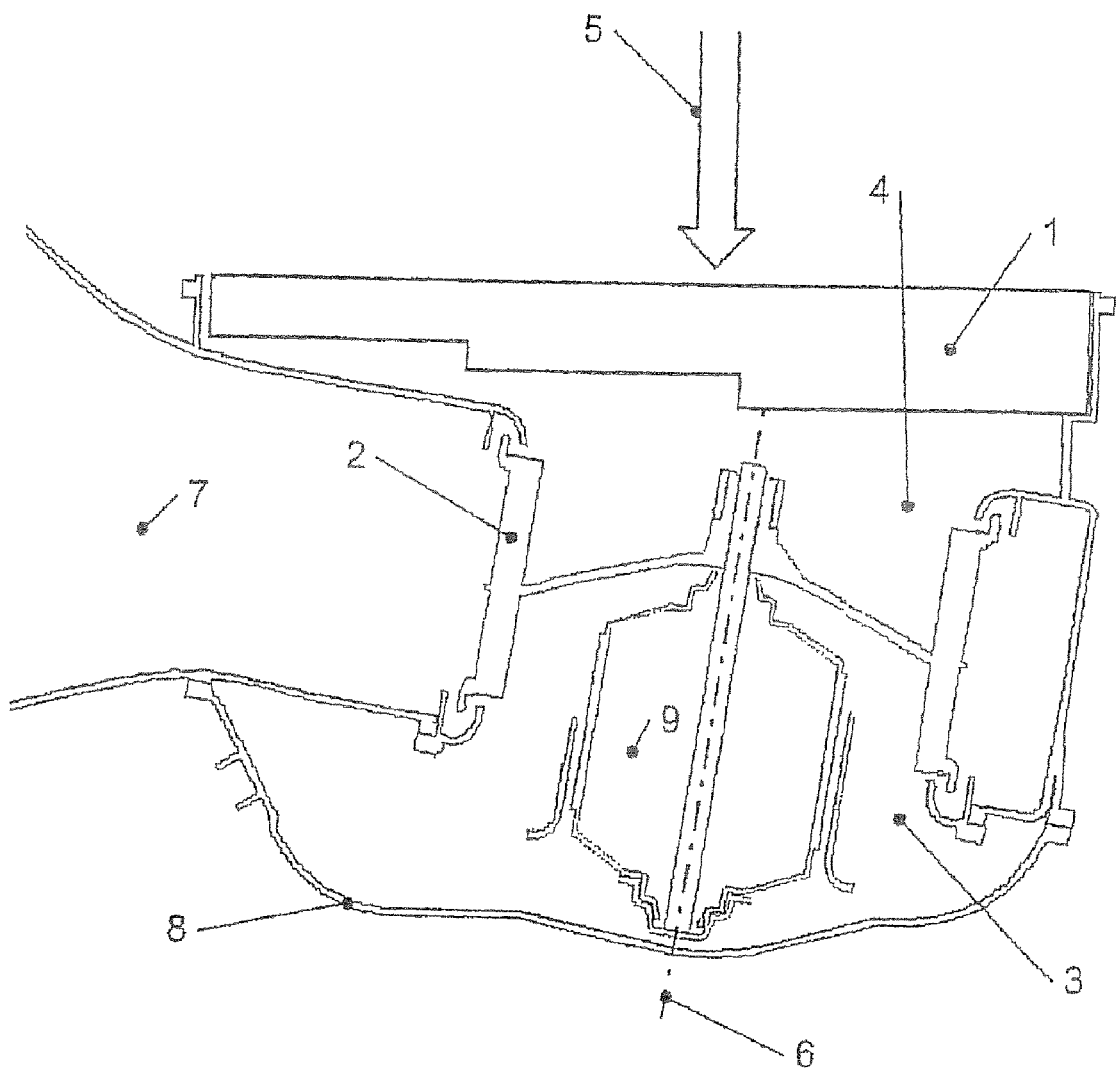
FIG. 3 is an air filter and fan device with inclined fan axis and filter established stepped, in cross-sectional view.

In FIG. 3, another alternative embodiment of the solution according to the invention is shown. Here the filter 1 is established stepped so that the filter can be adapted to the inclined fan axis by means of stepping.

Figure 4:
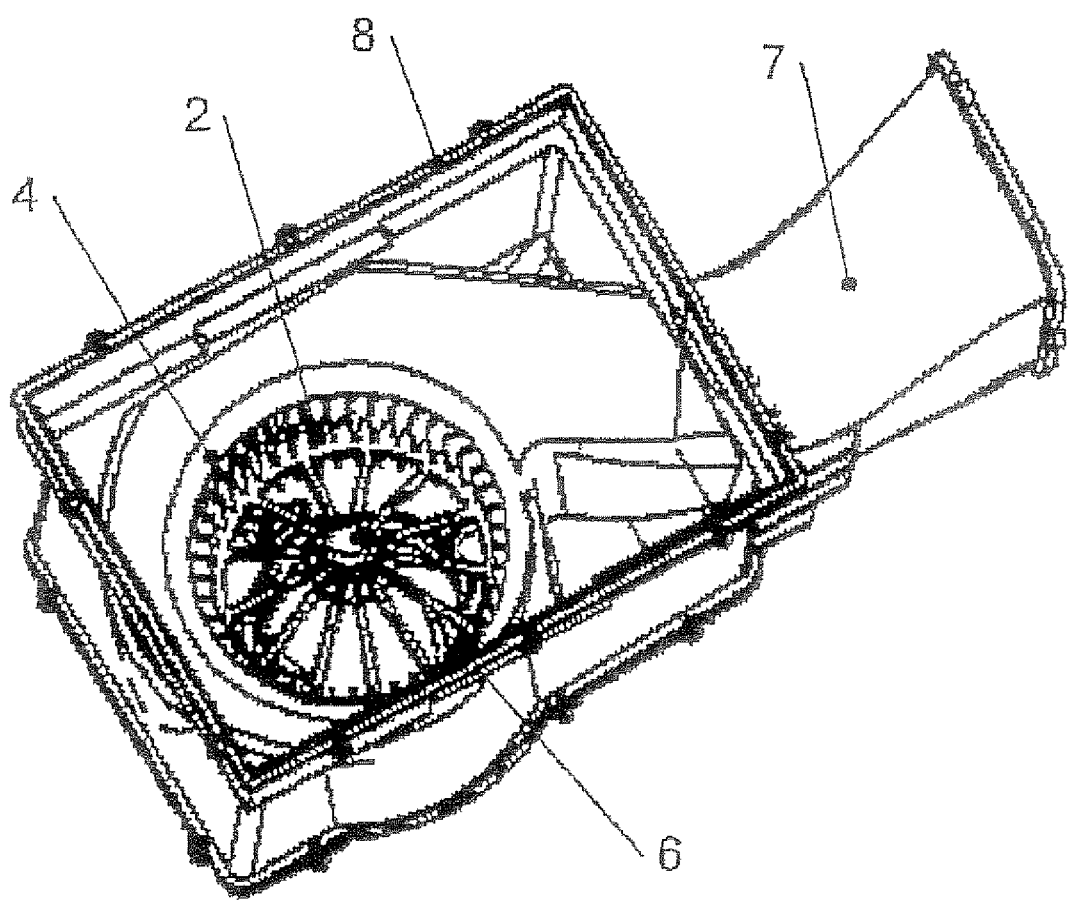
FIG. 4 is an air filter and fan device in perspective view.

FIG. 4 shows a perspective view of an air filter and fan device for vehicle ventilation systems. In the perspective view the flow guiding device 8 is established as a casing for the fan and the flow-off channel 7. This view also shows the upper side 4 of the impeller 2. Further, the regions for the flow path of the air are seen that flows past the flow-off channel 7 to the lower side of the casing 8 and from there to the lower side 3 of the impeller 2. According to this representation, these flow paths will preferably pass over the corner regions of the casing 8. The fan motor 9 is positioned below the impeller 2. The support surfaces of the filter 1 in the embodiment as stepped filter 1 are shown at the longitudinal edges of the casing 8.

Figure 5:
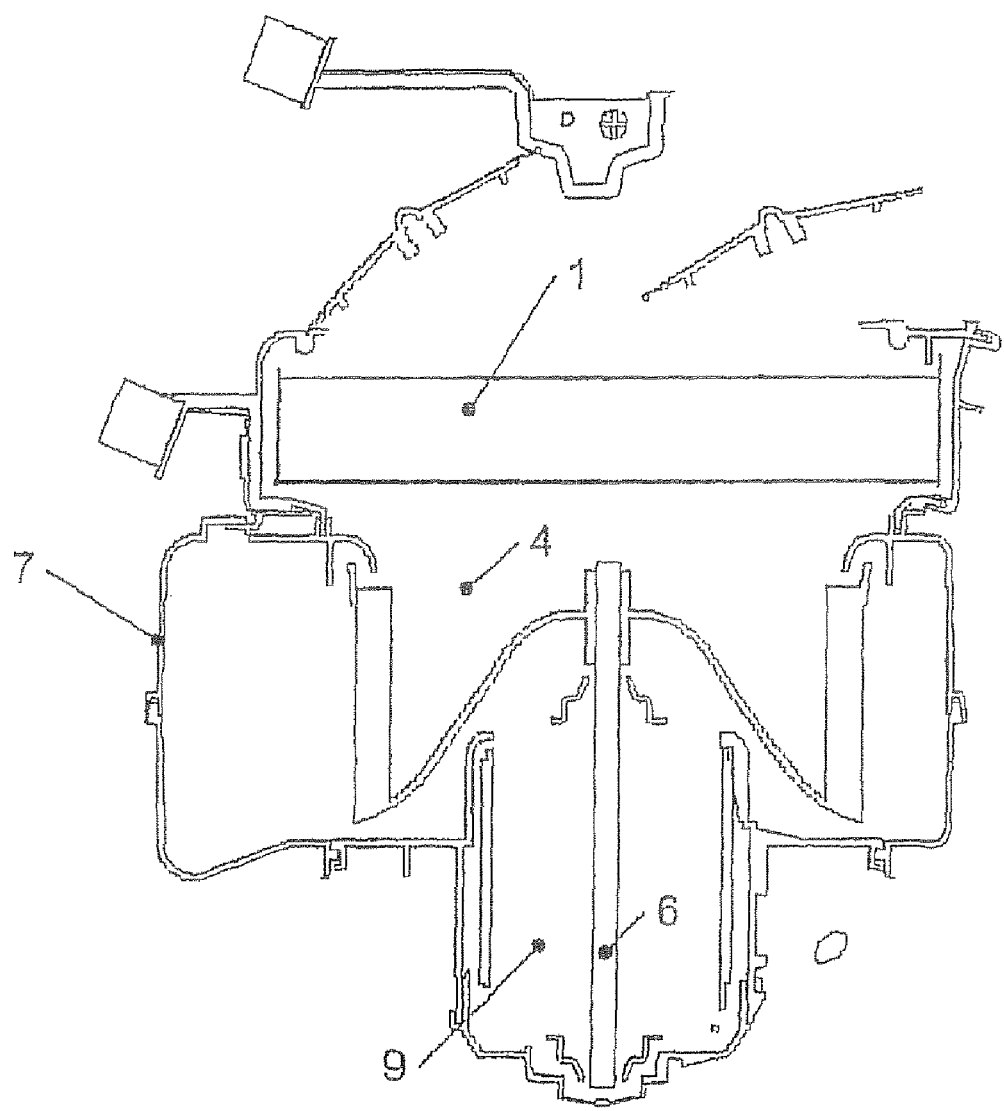
FIG. 5 is an air filter and fan device according to prior art.

Finally, in FIG. 5, prior art is shown. The fan with the impeller 2 and the fan motor 9 is one-suction and established approachable only from the upper side. This results, as a particular disadvantage, essentially in that flow distribution in filter 1 is in stepped intensity toward the center of the fan axis. In addition, the overall dimensions of these conventional arrangements are very large, because certain synergisms for cooperative use of components can no longer be employed.

NOMENCLATURE 1 air filter
2 impeller
3 lower side of the impeller
4 upper side of the impeller
5 direction of flow
6 fan axis 7 flow-off channel
8 flow guiding device, casing
9 fan motor

What is claimed is:

1. An air filtering and fan system for a vehicle ventilation system comprising:
   a casing including a flow-off channel formed therein;
   an impeller having a first side and a second side disposed in said casing and adapted to be driven by a motor, the first side and the second side in side-by-side relation in a common plane, wherein the common plane is substantially parallel to a rotation axis of said impeller; and
   a filter disposed upstream of and in fluid communication with the first side and the second side of said impeller, wherein air flowing through said filter is received by the first side and the second side of said impeller and caused to flow to the flow-off channel, wherein the rotation axis of said impeller is deviated from alignment with a direction of flow of the air through said filter.

2. The system according to claim 1, wherein said impeller is deviated from alignment at an angle between 0° and 90°.

3. The system according to claim 2, wherein the angle is between 8° and 12°.

4. The system according to claim 3, wherein the angle is about 10°.

5. The system according to claim 1, wherein said filter is stepped.

6. The system according to claim 1, wherein said filter is substantially wedge shaped.

7. The system according to claim 1, wherein said filter is formed from a folded filter paper.

8. An air filtering and fan system for a vehicle ventilation system comprising:
   a casing including a flow-off channel formed therein;
   an impeller adapted to be driven by a motor, said impeller including a first side and a second side in side-by-side relation in a common plane, wherein the common plane is substantially parallel to a rotation axis of said impeller; and
   a filter having a first height and a second height greater than the first height, said filter disposed upstream of and in fluid communication with said impeller, wherein the air flowing through said filter is received by the first side and the second side of said impeller and caused to flow to the flow-off channel, wherein the rotation axis of said impeller is deviated from alignment with a direction of flow of the air through said filter.

9. The system according to claim 8, wherein said impeller is deviated from alignment at an angle between 0° and 90°.

10. The system according to claim 9, wherein the angle is between 8° and 12°.

11. The system according to claim 10, wherein the angle is about 10°.

12. The system according to claim 8, wherein said filter is stepped.

13. The system according to claim 8, wherein said filter is substantially wedge shaped.

14. The system according to claim 8, wherein said filter is formed from a folded filter paper.

15. An air filtering and fan system for a vehicle ventilation system comprising:
   a casing including a flow-off channel formed therein;
   an impeller having a first side and a second side disposed in said casing and adapted to be driven by a motor, the first side and the second side in side-by-side relation in a common plane, wherein the common plane is substantially parallel to a rotation axis of said impeller; and
   a filter having a first height and a second height greater than the first height, wherein a portion of said filter having the second height is closer to said impeller than a portion of said filter having the first height, said filter disposed upstream of and in fluid communication with the first side and the second side of said impeller, wherein air flowing through said filter is received by the first side and the second side of said impeller and caused to flow to the flow-off channel, wherein the rotation axis of said impeller is deviated from alignment with a direction of flow of the air through said filter.

16. The system according to claim 15, wherein said filter is stepped.

17. The system according to claim 15, wherein said filter is formed from a folded filter paper.

* * * * *